United States Patent
Sugiyama

(10) Patent No.: US 10,875,940 B2
(45) Date of Patent: Dec. 29, 2020

(54) FLUORINATED POLYMER, METHOD FOR PRODUCING IT, AND ARTICLE HAVING CURED PRODUCT OF FLUORINATED POLYMER

(71) Applicant: AGC Inc., Chiyoda-ku (JP)

(72) Inventor: Norihide Sugiyama, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 107 days.

(21) Appl. No.: 16/267,407

(22) Filed: Feb. 5, 2019

(65) Prior Publication Data
US 2019/0169326 A1 Jun. 6, 2019

Related U.S. Application Data

(63) Continuation of application No. PCT/JP2017/029683, filed on Aug. 18, 2017.

(30) Foreign Application Priority Data

Aug. 29, 2016 (JP) .................. 2016-167131

(51) Int. Cl.
| | |
|---|---|
| *C08F 8/42* | (2006.01) |
| *C08F 14/26* | (2006.01) |
| *C08F 14/18* | (2006.01) |
| *C08F 14/22* | (2006.01) |
| *C08F 216/14* | (2006.01) |
| *C08J 5/18* | (2006.01) |
| *C08K 5/548* | (2006.01) |
| *C08K 5/544* | (2006.01) |
| *C08K 5/5435* | (2006.01) |
| *C09D 127/12* | (2006.01) |
| *C09D 127/18* | (2006.01) |

(52) U.S. Cl.
CPC ............. *C08F 14/26* (2013.01); *C08F 8/42* (2013.01); *C08F 14/18* (2013.01); *C08F 14/22* (2013.01); *C08F 216/14* (2013.01); *C08J 5/18* (2013.01); *C08K 5/544* (2013.01); *C08K 5/548* (2013.01); *C08K 5/5435* (2013.01); *C09D 127/12* (2013.01); *C09D 127/18* (2013.01)

(58) Field of Classification Search
CPC .. C08F 14/26; C08F 8/42; C08F 14/18; C08F 14/22; C08F 216/14; C08J 5/18; C08K 5/5435; C08K 5/544; C08K 5/548; C09D 127/12; C09D 127/18
USPC ........................................................ 524/805
See application file for complete search history.

(56) References Cited

U.S. PATENT DOCUMENTS

2008/0081195 A1 4/2008 Chung et al.

FOREIGN PATENT DOCUMENTS

| JP | 2010-505995 | 2/2010 | |
|---|---|---|---|
| JP | 2012-109542 | 6/2012 | |
| JP | 2012109542 A * | 6/2012 | ........... C09D 183/02 |
| JP | 2014-070164 | 4/2014 | |
| WO | WO 2009/096342 A1 | 8/2009 | |
| WO | WO 2018/159307 A1 | 9/2018 | |

OTHER PUBLICATIONS

U.S. Appl. No. 16/451,243, filed Jun. 25, 2019, Ohkura, M., et al.
U.S. Appl. No. 15/176,408, filed Jun. 8, 2016, US 2016-0280865 A1, Sugiyama, N., et al.
U.S. Appl. No. 15/890,873, filed Feb. 7, 2018, US 2018-0162974 A1, Sugiyama, N., et al.
U.S. Appl. No. 16/452,610, filed Jun. 26, 2019, Ohkura, M., et al.

* cited by examiner

*Primary Examiner* — Kelechi C Egwim
(74) *Attorney, Agent, or Firm* — Oblon, McClelland, Maier & Neustadt, L.L.P.

(57) ABSTRACT

To provide a fluorinated polymer which can be heat-cured at low temperature (from room temperature to 150° C.).
A fluorinated polymer containing units represented by the following formula (1):

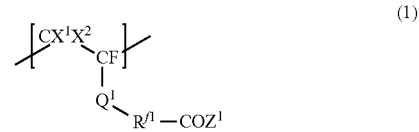

wherein $X^1$ and $X^2$ are each independently a hydrogen atom or a fluorine atom,
$Q^1$ is a single bond or an etheric oxygen atom,
$R^{f1}$ is a fluoroalkylene group or a fluoroalkylene group having at least 2 carbon atoms and having an etheric oxygen atom between carbon atoms,
$Z^1$ is $NR^1$—$Y^1$, O—$Y^2$ or S—$Y^3$,
$R^1$ is a hydrogen atom, an alkyl group or an aryl group, and
$Y^1$, $Y^2$ and $Y^3$ are each independently a group having at least one hydrolyzable silyl group.

14 Claims, 1 Drawing Sheet

FLUORINATED POLYMER, METHOD FOR PRODUCING IT, AND ARTICLE HAVING CURED PRODUCT OF FLUORINATED POLYMER

TECHNICAL FIELD

The present invention relates to a fluorinated polymer, a method for producing it, and an article having a cured product of the fluorinated polymer.

BACKGROUND ART

Fluorinated polymers have been utilized as various industrial materials, making use of their excellent properties such as heat resistance, chemical resistance, low surface energy, low refractive index and low dielectric constant. Particularly, fluorinated polymers represented by polytetrafluoroethylene (PTFE), poly(tetrafluoroethylene-hexafluoropropylene) (FEP) and poly(tetrafluoroethylene-perfluoroalkyl vinyl ether) (PFA) have characteristic physical properties which are not achieved by other organic or inorganic materials.

Patent Document 1 discloses a liquid curable fluorinated polymer having $CF_2=CFO-$ (perfluorovinyl ether) groups and discloses that the fluorinated polymer is heat-cured to obtain a cured product excellent in heat resistance and light resistance.

PRIOR ART DOCUMENTS

Patent Documents

Patent Document 1: WO2009/096342

DISCLOSURE OF INVENTION

Technical Problem

However, in order to heat-cure the curable fluorinated polymer as disclosed in Patent Document 1, it is necessary to heat it to so high temperature as exceeding 150° C. The object of the present invention is to provide a fluorinated polymer which can be heat-cured at low temperature of from room temperature to 150° C.

Solution to Problem

The present invention provides a fluorinated polymer, a method for producing it, and an article having a cured product of the fluorinated polymer, of the following [1] to [14].

[1] A fluorinated polymer containing units represented by the following formula (1):

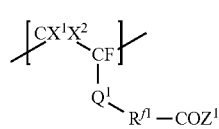

(1)

wherein $X^1$ and $X^2$ are each independently a hydrogen atom or a fluorine atom, $Q^1$ is a single bond or an etheric oxygen atom, $R^{f1}$ is a fluoroalkylene group or a fluoroalkylene group having at least 2 carbon atoms and having an etheric oxygen atom between carbon atoms, $Z^1$ is $NR^1-Y^1$, $O-Y^2$ or $S-Y^3$, $R^1$ is a hydrogen atom, an alkyl group or an aryl group, and $Y^1$, $Y^2$ and $Y^3$ are each independently a group having at least one hydrolyzable silyl group.

[2] The fluorinated polymer according to [1], wherein the units represented by the formula (1) are $-[CF_2-CF(O(CF_2)_3CONH-C_3H_6-SiR^2_m\ _1(W^1)_{3-m\ 1})]-$ or $-[CF_2-CF(O(CF_2)_3CONH-C_2H_4-NH-C_3H_6-SiR^2_m\ _1(W^1)_{3-m\ 1})]-$, wherein $R^2$ is each independently an alkyl group, $W^1$ is each independently a halogen atom or an alkoxy group, and m is each independently 0, 1 or 2.

[3] The fluorinated polymer according to [1] or [2], which further contains units represented by the following formula (1a):

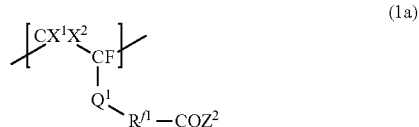

(1a)

wherein $X^1$, $X^2$, $Q^1$ and $R^{f1}$ are as defined in Claim 1, $Z^2$ is a halogen atom, OH or $OR^7$, and $R^7$ is an alkyl group.

[4] The fluorinated polymer according to [3], wherein $Z^1$ is $NR^1-Y^1$, and $Z^2$ is $OR^7$.

[5] The fluorinated polymer according to any one of [1] to [4], which further contains units derived from a fluoroethylene.

[6] The fluorinated polymer according to any one of [1] to [5], which further contains units represented by the following formula (3) (excluding units derived from a fluoroethylene):

$$-[CX^3X^4-CX^5X^6]-\quad(3)$$

wherein $X^3$ and $X^4$ are each independently a hydrogen atom, a fluorine atom or a chlorine atom, $X^5$ is a hydrogen atom, a fluorine atom or a chlorine atom, and $X^6$ is a hydrogen atom, a fluoroalkyl group, a fluoroalkyl group having at least 2 carbon atoms and having an etheric oxygen atom between carbon atoms, a fluoroalkoxy group, a fluoroalkoxy group having at least 2 carbon atoms and having an etheric oxygen atom between carbon atoms, a fluoroalkenyl group, or a fluoroalkenyl group having at least 3 carbon atoms and having an etheric oxygen atom between carbon atoms.

[7] The fluorinated polymer according to any one of [1] to [6], wherein the content of the group represented by $-COZ^1$ is from 0.01 to 4 mmol/g.

[8] A method for producing the fluorinated polymer as defined in any one of [1] to [7], which comprises reacting a fluorinated polymer containing units represented by the following formula (1a) and not containing the above units (1), and at least one compound selected from the group consisting of an aminosilane compound, an epoxysilane compound, a mercaptosilane compound and an isocyanatosilane compound:

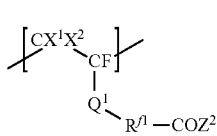

(1a)

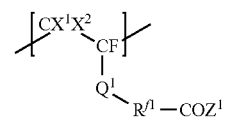

(1)

wherein $X^1$, $X^2$, $Q^1$ and $R^{f1}$ are as defined in Claim 1, and $Z^2$ is as defined in Claim 3.

[9] A coating composition, which comprises the fluorinated polymer as defined in any one of [1] to [7], and a fluorinated solvent.

[10] A cured product of the fluorinated polymer as defined in any one of [1] to [7].

[11] A formed product formed from the cured product as defined in [10].

[12] The formed product according to [11], which is a film.

[13] An article comprising a substrate, and a layer of a cured product of the fluorinated polymer as defined in any one of [1] to [7], formed on the surface of the substrate.

[14] The article according to [13], which has a primer layer between the surface of the substrate and the layer of a cured product of the fluorinated polymer.

Advantageous Effects of Invention

According to the present invention, it is possible to provide a fluorinated polymer which can be heat-cured at relatively low temperature.

DESCRIPTION OF EMBODIMENTS

Figure 1:
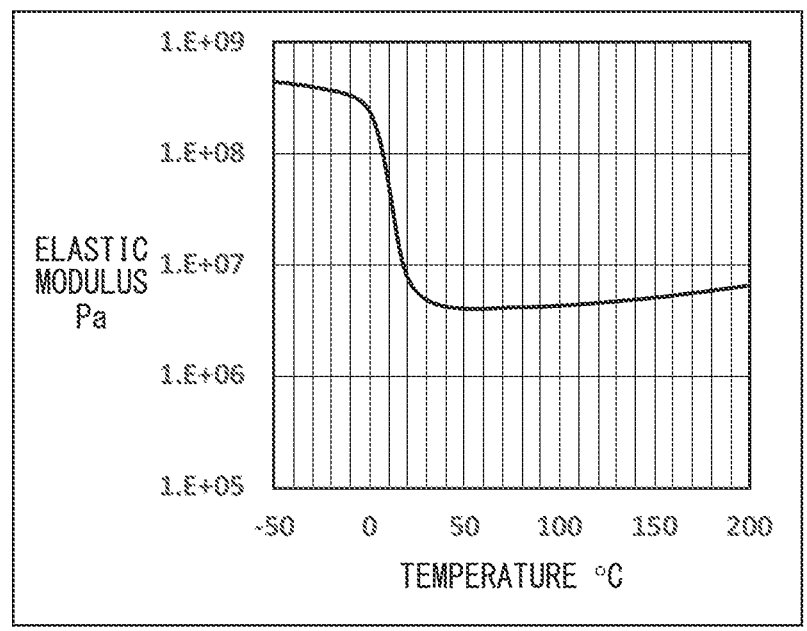
FIG. 1 is a drawing illustrating the relation between the temperature and the elastic modulus of the film obtained in Ex. 1.

Now, the present invention will be described. It should be understood that the present invention is by no means restricted to the following description.

A compound represented by the formula (a) will sometimes be referred to as "compound (a)". The same applies to the compounds represented by other formulae.

Units represented by the formula (b) will sometimes be referred to as "units (b)". The same applies to units represented by other formulae.

Units derived from a monomer may sometimes be called by a name having "units" attached to the monomer name. For example, units derived from a fluoroethylene will be referred to as "fluoroethylene units".

The meanings of the following terms in this specification are as follows.

A "fluoroethylene" means tetrafluoroethylene ($CF_2=CF_2$) and compounds in which one to three fluorine atoms in tetrafluoroethylene are substituted by a hydrogen atom or a halogen atom other than fluorine (a chlorine atom, a bromine atom or an iodine atom). Hereinafter tetrafluoroethylene will sometimes be referred to as "TFE", trifluoroethylene as "TrFE", and chlorotrifluoroethylene as "CTFE".

[Fluorinated Polymer]

The fluorinated polymer of the present invention contains the units (1):

wherein $X^1$ and $X^2$ are each independently a hydrogen atom or a fluorine atom, $Q^1$ is a single bond or an etheric oxygen atom, $R^{f1}$ is a fluoroalkylene group or a fluoroalkylene group having at least 2 carbon atoms and having an etheric oxygen atom between carbon atoms, $Z^1$ is $NR^1$—$Y^1$, O—$Y^2$ or S—$Y^3$, $R^1$ is a hydrogen atom, an alkyl group or an aryl group, and $Y^1$, $Y^2$ and $Y^3$ are each independently a group having at least one hydrolyzable silyl group.

The fluorinated polymer of the present invention, which has a group having a hydrolyzable silyl group, is hydrolyzed/condensed by moisture in the air and crosslinked, thereby to obtain a cured product.

$X^1$ and $X^2$ are preferably the same and are preferably fluorine atoms.

$Q^1$ is preferably an etheric oxygen atom.

In a case where $R^{f1}$ is a fluoroalkylene group, its number of carbon atoms is preferably from 1 to 6, particularly preferably from 1 to 4. When its number of carbon atoms is 3 or more, it preferably has a linear structure in view of excellent heat stability. The fluoroalkylene group is preferably a perfluoroalkylene group in view of excellent heat stability. That is, $R^{f1}$ is preferably a $C_{1-6}$ perfluoroalkylene group, particularly preferably a $C_{1-4}$ perfluoroalkylene group.

In a case where $R^{f1}$ is a fluoroalkylene group having at least 2 carbon atoms and having an etheric oxygen atom between carbon atoms, its number of carbon atoms is preferably from 2 to 10, particularly preferably from 2 to 6. When its number of carbon atoms is 3 or more, it preferably has a linear structure in view of excellent heat stability. The fluoroalkylene group is preferably a perfluoroalkylene group in view of excellent heat stability. That is, $R^{f1}$ is preferably a $C_{2-10}$ fluoroalkylene group having an etheric oxygen atom between carbon atoms, particularly preferably a $C_{2-6}$ fluoroalkylene group having an etheric oxygen atom between carbon atoms.

The hydrolyzable silyl group in $Z^1$ is represented by —$SiR^2_{m1}(W^1)_{3-m1}$ (wherein $R^2$ is each independently an alkyl group, $W^1$ is each independently a halogen atom or an alkoxy group, and ml is 0, 1 or 2). The number of carbon atoms of $R^2$ is preferably from 1 to 6, particularly preferably 1 or 2. The halogen atom as $W^1$ may be a fluorine atom, a chlorine atom, a chlorine atom or a bromine atom, and is preferably a fluorine atom or a chlorine atom. The alkoxy group as $W^1$ is, in view of more excellent low temperature curing property, preferably a $C_{1-6}$ alkoxy group, more preferably a $C_{1-2}$ alkoxy group, particularly preferably a $C_1$ alkoxy group.

The hydrolyzable silyl group is more preferably —$SiCH_3(OCH_3)_2$ or —$SiCH_3(OC_2H_5)_2$, and in view of excellent low temperature curing property and storage stability, particularly preferably —$SiCH_3(OCH_3)_2$. The number of the hydrolyzable silyl group in $Z^1$ is not particularly limited, and is preferably 1.

In a case where $R^1$ is an alkyl group in $NR^1$—Y, it is preferably a $C_{1-6}$ alkyl group, particularly preferably a $C_{1-2}$ alkyl group. In a case where $R^1$ is an aryl group, it is preferably a $C_{6-20}$ aryl group, particularly preferably a phenyl group. $R^1$ is, in view of excellent solubility in the after-described fluorinated solvent, preferably a hydrogen atom, a $C_{1-6}$ alkyl group or a phenyl group, and in view of high hydrogen bonding property and excellent adhesion to various substrates, particularly preferably a hydrogen atom.

As a specific example of $Y^1$, the following formula (10a) may be mentioned.

$$R^3—SiR^2{}_{m1}(W^1)_{3-m1} \quad (10a)$$

wherein $R^3$ is an alkylene group, an arylene group or an alkylene group having at least 2 carbon atoms and having an amino group between carbon atoms, and $R^2$, $W^1$ and m are as defined for $Z^1$, and their preferred ranges are also the same.

In a case where $R^3$ is an alkylene group, it is preferably a $C_{1-6}$ alkylene group, particularly preferably a $C_{2-3}$ alkylene group. In a case where $R^3$ is an arylene group, it is preferably a $C_{6-20}$ arylene group, particularly preferably a phenylene group.

In a case where $R^3$ is an alkylene group having at least 2 carbon atoms and having an amino group between carbon atoms, its number of carbon atoms is preferably from 2 to 12, particularly preferably from 4 to 6. The amino group contained in $R^3$ is represented by $—NR^4—$, wherein $R^4$ is as defined for $R^1$ and its preferred range is also the same.

$R^3$ is, in view of excellent solubility in the fluorinated solvent, preferably properly selected from a $C_{1-6}$ alkylene group, a $C_{6-20}$ arylene group and a $C_{2-12}$ alkylene group having an amino group between carbon atoms, particularly preferably $—C_2H_4—$, $—C_3H_6—$, a phenylene group, or a $C_{4-5}$ alkylene group having $—NH—$ between carbon atoms.

Accordingly, $Y^1$ is preferably $C_2H_4—SiR^2{}_{m1}(W^1)_{3-m1}$, $C_3H_6—SiR^2{}_{m1}(W^1)_{3-m1}$ or $C_2H_4—NH—C_3H_6—R^2{}_{m1}(W^1)_{3-m1}$, particularly preferably $C_3H_6—SiCH_3(OCH_3)_2$, $C_2H_4—NR^4—C_3H_6—Si(OC_2H_5)_3$ or $C_2H_4—NR^4—C_3H_6—SiCH_3(OCH_3)_2$.

$NR^1—Y^1$ is, in view of excellent solubility in the fluorinated solvent, curing reactivity and/or storage stability, preferably $NHC_3H_6Si(OC_2H_5)_3$, $NHC_3H_6SiCH_3(OCH_3)_2$, $NHC_2H_4—NH—C_3H_6—Si(OC_2H_5)_3$ or $NHC_2H_4—NH—C_3H_6—SiCH_3(OCH_3)_2$, particularly preferably $NHC_3H_6SiCH_3(OCH_3)_2$ or $C_2H_4—NH—C_3H_6—SiCH_3(OCH_3)_2$.

In $O—Y^2$, as a specific example of $Y^2$, the following formula (10b) may be mentioned.

$$R^5—SiR^2{}_{m1}(W^1)_{3-m1} \quad (10b)$$

wherein $R^5$ is an alkylene group, an alkylene group having at least 2 carbon atoms and having an etheric oxygen atom between carbon atoms, an alkylene group having at least 2 carbon atoms, having an etheric oxygen atom between carbon atoms, and having at least one hydrogen atom substituted by a hydroxy group, or an arylene group, and $R^2$, $W^1$ and m1 are as defined for $Z^1$ and their preferred ranges are also the same.

In a case where $R^5$ is an alkylene group, its number of carbon atoms is preferably from 1 to 6, particularly preferably 1 or 2. In a case where $R^5$ is an alkylene group having at least 2 carbon atoms and having an etheric oxygen atom between carbon atoms, its number of carbon atoms is preferably from 2 to 12, particularly preferably from 3 to 6. In a case where $R^5$ is an alkylene group having at least 2 carbon atoms, having an etheric oxygen atom between carbon atoms and having at least one hydrogen atom substituted by a hydroxy group, its number of carbon atoms is preferably from 2 to 12, particularly preferably from 3 to 8. Further, in a case where $R^5$ is an alkylene group having at least 2 carbon atoms, having an etheric oxygen atom between carbon atoms and having at least one hydrogen atom substituted by a hydroxy group, it is preferably a group represented by $CH_2CH(OH)—R^6$. Here, $R^6$ is an alkylene group having at least 2 carbon atoms and having an etheric oxygen atom between carbon atoms. In view of easy preparation, the number of carbon atoms of $R^6$ is preferably from 2 to 10, particularly preferably 3 or 4.

$R^5$ is, in view of easy preparation, preferably an alkylene group having at least 2 carbon atoms, having an etheric oxygen atom between carbon atoms and having at least one hydrogen atom substituted by a hydroxy group, particularly preferably $CH_2CH(OH)CH_2OC_3H_6$.

In $S—Y^3$, as a specific example of $Y^3$, the formula (10a) may be mentioned.

As specific examples of $Z^1$, the following groups may be mentioned.

—$NHC_3H_6Si(OCH_3)_3$
—$NHC_3H_6Si(OC_2H_5)_3$
—$NHC_3H_6SiCH_3(OCH_3)_2$
—$NHC_3H_6SiCH_3(OC_2H_5)_2$
—$NHC_2H_4NHC_3H_6Si(OCH_3)_3$
—$NHC_2H_4NHC_3H_6Si(OC_2H_5)_3$
—$NHC_2H_4NHC_3H_6SiCH_3(OCH_3)_2$
—$NHC_2H_4SiCH_3(OC_2H_5)_2$
—$N(C_6H_5)C_3H_6Si(OCH_3)_3$
—$N(C_6H_5)C_3H_6Si(OC_2H_5)_3$
—$N(C_6H_5)C_3H_6SiCH_3(OCH_3)_2$
—$N(C_6H_5)C_3H_6SiCH_3(OC_2H_5)_2$
—$NHC_6H_4Si(OCH_3)_3$
—$NHC_6H_4Si(OC_2H_5)_3$
—$NHC_6H_4SiCH_3(OCH_3)_2$
—$NHC_6H_4SiCH_3(OC_2H_5)_2$
—$OCH_2CH(OH)CH_2OC_3H_6Si(OCH_3)_3$
—$OCH_2CH(OH)CH_2OC_3H_6Si(OC_2H_5)_3$
—$OCH_2CH(OH)CH_2OC_3H_6SiCH_3(OCH_3)_2$
—$OCH_2CH(OH)CH_2OC_3H_6SiCH_3(OC_2H_5)_2$
—$SC_3H_6Si(OCH_3)_3$
—$SC_3H_6Si(OC_2H_5)_3$
—$SC_3H_6SiCH_3(OCH_3)_2$
—$SC_3H_6SiCH_3(OC_2H_5)_2$

As specific examples of the unit (1), the following units may be mentioned.

—$[CF_2—CF(O(CF_2)_2—COZ^1)]$—
—$[CF_2—CF(O(CF_2)_3—COZ^1)]$—
—$[CF_2—CF(O(CF_2)_4—COZ^1)]$—
—$[CF_2—CF(OCF_2CF(CF_3)O(CF_2)_2—COZ^1)]$—
—$[CF_2—CF(OCF_2CF(CF_3)O(CF_2)_3—COZ^1)]$—
—$[CF_2—CF(O(CF_2)_3O(CF_2)_2—COZ^1)]$—
—$[CF_2—CF(O(CF_2)_2O(CF_2)_2—COZ^1)]$—
—$[CH_2—CF(CF_2OCF(CF_3)—COZ^1)]$—
—$[CH_2—CF(CF_2OCF(CF_3)CF_2OCF(CF_3)—COZ^1)]$—

In view of excellent heat stability and availability, the unit (1) is preferably —$[CF_2—CF(O(CF_2)_3—COZ^1)]$—, particularly preferably —$[CF_2—CF(O(CF_2)_3CONH—C_3H_6—SiR^2{}_{m1}(W^1)_{3-m1})]$— or —$[CF_2—CF(O(CF_2)_3CONH—C_2H_4—NH—C_3H_6—SiR^2{}_{m1}(W^1)_{3-m1})]$—. The fluorinated polymer may contain two or more types of units (1) differing in $Z^1$.

The fluorinated polymer of the present invention may contain units other than the units (1). Other units may be the after-described units (1a), the after-described units (1b), fluoroethylene units (hereinafter sometimes referred to as "units (2)"), the after-described units (3), and units other than the units (1), the units (1a), the units (1b), the units (2) and the units (3) (hereinafter sometimes referred to as "units (4)").

The fluorinated polymer of the present invention preferably contains units (1a), whereby UV curing is possible. In such a case, in order that both heat curing and UV curing can be employed, it is particularly preferred that $Z^1$ in the unit (1) is $NR^1$—$Y^1$, and $Z^2$ is $OR^7$. Further, in view of high adhesion to various substrates, the fluorinated polymer preferably contains units (1b).

Such other units may be used alone or in combination of two or more types. For example, the fluorinated polymer may contain a single type of units (1b) and two or more types of units (2).

The unit (1a) is a unit represented by the following formula (1a).

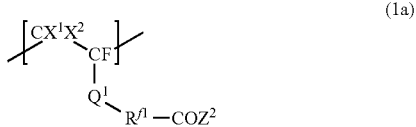
(1a)

wherein $X^1$, $X^2$, $Q^1$ and $R^{f1}$ are as defined in the formula (1), $Z^2$ is a halogen atom, OH or $OR^7$, and $R^7$ is an alkyl group.

In a case where $Z^2$ is a halogen atom, it may be a fluorine atom, a chlorine atom, a bromine atom or an iodine atom, and is preferably a fluorine atom or a chlorine atom. $R^7$ is preferably $C_{1-6}$ alkyl group, more preferably —$CH_3$ or —$C_2H_5$, particularly preferably —$CH_3$. $Z^2$ is preferably $OR^7$, whereby a reaction with the after-described aminosilane compound to form the units (1) will stably be carried out without gelation.

The units (1a) may be formed by polymerization using a compound (11) as a monomer.

$$CX^1X^2=CF-Q^1-R^{f1}—COZ^2 \quad (11)$$

wherein $X^1$, $X^2$, $Q^1$ and $R^{f1}$ are as defined in the formula (1), and $Z^2$ is as defined in the formula (1a).

The unit (1b) is a unit represented by the following formula (1b):

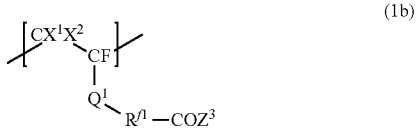
(1b)

wherein $Z^3$ is $NR^8H$ or $NR^9$—$NR^{10}H$, $R^8$ and $R^9$ are each independently a hydrogen atom or an alkyl group, $R^{10}$ is a hydrogen atom or a methyl group, and $X^1$, $X^2$, $Q^1$ and $R^{f1}$ are as defined in the formula (1).

The units (1b) may be obtained by reacting a fluorinated polymer containing units (1a) wherein $Z^2$ is $OR^7$, and at least one compound selected from the group consisting of an amine compound represented by the following formula (12) (hereinafter sometimes referred to as "amine compound (12)") and a hydrazine compound represented by the following formula (13) (hereinafter sometimes referred to as "hydrazine compound (13)").

$$HNR^8—H \quad (12)$$

$$HNR^9—NR^{10}H \quad (13)$$

The amine compound (12) may, for example, be ammonia, methylamine, ethylamine, propylamine or isopropylamine. The hydrazine compound (13) may, for example, be hydrazine, phenylhydrazine, methylhydrazine or 1,2-dimethylhydrazine.

The total amount of the amine compound (12) and the hydrazine compound (13) used for the reaction is not particularly limited so long as a fluorinated polymer having the desired amount of —$COZ^3$ per 1 mol of the group represented by —$COOR^7$ of the fluorinated polymer containing units (1a) wherein $Z^2$ is $OR^7$ can be obtained, and is preferably from 0.1 to 20 mol, more preferably from 0.3 to 15 mol, particularly preferably from 0.5 to 10 mol.

The reaction may be carried out in the presence of a solvent. The solvent is preferably one in which raw material components (the fluorinated polymer containing the units (1a) wherein $Z^2$ is $OR^7$, the amine compound (12) and the hydrazine compound (13)) are soluble, and is preferably a solvent in which at least the fluorinated polymer containing units (1a) wherein $Z^2$ is $OR^7$ is soluble. The solvent may be the after-described fluorinated solvent.

The reaction is carried out, for example, by dissolving the fluorinated polymer containing units (1a) wherein $Z^2$ is $OR^7$ in the fluorinated solvent, and adding at least one compound selected from the group consisting of the amine compound (12) and the hydrazine compound (13) at from 0 to 30° C. After the addition, the mixture is heated to 30 to 100° C. and reacted for from 1 minute to 10 hours to obtain a fluorinated polymer having units (1b).

The unit (2) is a fluoroethylene unit. As specific examples of the unit (2), a TFE unit, a TrFE unit, a CTFE unit or a vinylidene fluoride unit may be mentioned. In view of excellent heat resistance, a TFE unit, a TrFE unit or a CTFE unit is preferred. A TFE unit is particularly preferred in that —$COZ^1$ groups having high polarity are likely to be present at the interface while the chemical resistance is maintained, whereby the resulting fluorinated polymer and a cured product of the fluorinated polymer are excellent in adhesion to a substrate. A TrFE unit or a CTFE unit is particularly preferred in that high solubility is achieved, and regardless of the content of the —$COZ^1$ groups, the resulting fluorinated polymer and a cured product of the fluorinated polymer are excellent in adhesion.

The unit (3) is a unit represented by the following formula (3) (excluding the fluoroethylene unit):

$$—[CX^3X^4—CX^5X^6]— \quad (3)$$

wherein $X^3$ and $X^4$ are each independently a hydrogen atom, a fluorine atom or a chlorine atom, $X^5$ is a hydrogen atom, a fluorine atom or a chlorine atom, and $X^6$ is a hydrogen atom, a fluoroalkyl group, a fluoroalkyl group having at least 2 carbon atoms and having an etheric oxygen atom between carbon atoms, a fluoroalkoxy group, a fluoroalkoxy group having at least 2 carbon atoms and having an etheric oxygen atom between carbon atoms, a fluoroalkenyl group, or a fluoroalkenyl group having at least 3 carbon atoms and having an etheric oxygen atom between carbon atoms.

In a case where $X^6$ is a fluoroalkyl group, its number of carbon atoms is preferably from 1 to 15, particularly preferably from 1 to 6. In view of excellent heat stability, it is preferably a perfluoroalkyl group, more preferably a $C_{1-6}$ perfluoroalkyl group, particularly preferably —$CF_3$.

In a case where $X^6$ is a fluoroalkyl group having at least 2 carbon atoms and having an etheric oxygen atom between carbon atoms, its number of carbon atoms is preferably from 2 to 15, particularly preferably from 2 to 6. In view of excellent heat stability, it is preferably a perfluoroalkyl group having at least 2 carbon atoms and having an etheric oxygen atom between carbon atoms, particularly preferably a $C_{2-6}$ perfluoroalkyl group having an etheric oxygen atom between carbon atoms.

In a case where $X^6$ is a fluoroalkoxy group, its number of carbon atoms is preferably from 1 to 15, particularly preferably from 1 to 6. In view of excellent heat stability, it is preferably a $C_{1-6}$ perfluoroalkoxy group, particularly preferably —$OCF_3$, —$OCF_2CF_3$, —$O(CF_2)_2CF_3$ or —$OCF_2CF(CF_3)O(CF_2)_2CF_3$.

In a case where $X^6$ is a fluoroalkoxy group having at least 2 carbon atoms and having an etheric oxygen atom between carbon atoms, its number of carbon atoms is preferably from 2 to 15, particularly preferably from 2 to 6. In view of excellent heat stability, it is preferably a perfluoroalkoxy group having at least 2 carbon atoms and having an etheric oxygen atom between carbon atoms, particularly preferably a $C_{2-6}$ perfluoroalkoxy group having an etheric oxygen atom between carbon atoms. The fluoroalkoxy group having an etheric oxygen atom is most preferably —$OCF_2CF(CF_3)O(CF_2)_2CF_3$.

In a case where $X^6$ is a fluoroalkenyl group, its number of carbon atoms is preferably from 5 to 15, in order that cyclization reaction will not proceed in the molecule and in view of easy preparation. In view of excellent heat stability, it is preferably a perfluoroalkenyl group, particularly preferably —$(CF_2)_4CF=CF_2$, —$(CF_2)_5CF=CF_2$ or —$(CF_2)_6CF=CF_2$.

In a case where $Y^2$ is a fluoroalkenyl group having at least 3 carbon atoms and having an etheric oxygen atom between carbon atoms, its number of carbon atoms is preferably from 3 to 16, particularly preferably from 3 to 7. In view of excellent heat stability, it is preferably a perfluoroalkenyl group having at least 3 carbon atoms and having an etheric oxygen atom between carbon atoms, particularly preferably a $C_{3-7}$ perfluoroalkenyl group having an etheric oxygen atom between carbon atoms.

As specific examples of the unit (3), the following units may be mentioned.
—[$CH_2$—$CH_2$]—, —[$CF_2$—$CF(CF_3)$]—, —[$CH_2$—$CF(CF_3)$]—, —[$CF_2$—$CF(OCF_3)$]—, —[$CF_2$—$CF(OCF_2CF_3)$]—, —[$CF_2$—$CF(O(CF_2)_2CF_3)$]—, —[$CF_2$—$CF(O(CF_2)_3CF_3)$]—, —[$CF_2$—$CF(OCF_2CF(CF_3)O(CF_2)_2CF_3)$]—, —[$CF_2$—$CF(O(CF_2)_4OCF=CF_2)$]—, —[$CF_2$—$CF((CF_2)_4CF=CF_2)$]—, —[$CF_2$—$CF((CF_2)_5CF=CF_2)$]— and —[$CF_2$—$CF((CF_2)_6CF=CF_2)$]—.

In order that the resulting fluorinated polymer has a decreased glass transition temperature and thereby has excellent flowability and thus excellent forming property, and that when the fluorinated polymer is cured by at least one of heating and irradiation with active energy rays, mobility is high and intermolecular crosslinking reaction easily proceeds, the unit (3) is preferably —[$CH_2$—$CH_2$]—, —[$CF_2$—$CF(CF_3)$]—, —[$CF_2$—$CF(OCF_3)$]—, —[$CF_2$—$CF(O(CF_2)_2CF_3)$]— or —[$CF_2$—$CF(OCF_2CF(CF_3)O(CF_2)_2CF_3)$]—.

The units (3) may be formed by polymerization using a compound (31) as a monomer:

$$CX^3X^4=CX^5X^6 \quad (31)$$

wherein $X^3$, $X^4$, $X^5$ and $X^6$ are as defined in the formula (3).

In a case where $X^6$ is the fluoroalkenyl group, the double bond in the fluoroalkenyl group in the compound (31) does not contribute to the polymerization, and by polymerization of the compound (31), the unit (3) having a fluoroalkenyl group is formed.

The content of the group represented by —$COZ^1$ in the fluorinated polymer of the present invention is preferably from 0.01 to 4 mmol/g, more preferably from 0.01 to 2 mmol/g, further preferably from 0.04 to 2 mmol/g, particularly preferably from 0.1 to 1 mmol/g, to the mass of the fluorinated polymer. Here, the content of the group represented by —$COZ^1$ is the total content of CO—$NR^1$—Y, CO—O—$Y^2$ and CO—S—$Y^3$. When it is at least the lower limit value of the above range, the fluorinated polymer is crosslinked, and the obtained cured product of the fluorinated polymer is excellent in mechanical strength and heat stability. When it is at most the upper limit value of the above range, the cured product of the fluorinated polymer is excellent in solvent resistance and chemical resistance.

In the fluorinated polymer of the present invention, each of the contents of the group represented by —$COZ^1$ wherein $Z^1$ is $NR^1$—$Y^1$, the group represented by —$COZ^1$ wherein $Z^1$ is O—$Y^2$, and the group represented by —$COZ^1$ wherein $Z^1$ is S—$Y^3$, is preferably from 0.01 to 2 mmol/g, more preferably from 0.02 to 1 mmol/g, particularly preferably from 0.05 to 0.5 mmol/g, to the mass of the fluorinated polymer. When it is at least the lower limit value of the above range, a crosslinked structure by siloxane is formed, and the cured product of the fluorinated polymer is hardly dissolved or hardly has cracks even if exposed to a solvent. When it is at most the upper limit value of the above range, the after-described coating composition containing the fluorinated polymer is hardly gelled and is excellent in storage stability.

In a case where the fluorinated polymer of the present invention contains at least one of the units (1a) and the units (1b), the total content of the groups represented by —$COZ^1$, —$COZ^2$ and —$COZ^3$ is preferably from 0.01 to 4 mmol/g, more preferably from 0.01 to 2 mmol/g, further preferably from 0.04 to 2 mmol/g, particularly preferably from 0.1 to 1 mmol/g, to the mass of the fluorinated polymer. When it is at least the lower limit value of the above range, the fluorinated polymer is crosslinked, and the obtained cured product of the fluorinated polymer is excellent in mechanical strength and heat stability. When it is at most the upper limit value of the above range, the cured product of the fluorinated polymer is excellent in solvent resistance and chemical resistance.

The proportions of the groups represented by —$COZ^1$, —$COZ^2$ and —$COZ^3$ in the units (1) in the fluorinated polymer can be calculated by $^{19}$F-NMR measurement.

The content of the units (1) in all the units of the fluorinated polymer is preferably from 0.1 to 100 mol %, more preferably from 0.5 to 50 mol %, further preferably from 1 to 10 mol %, particularly preferably from 2 to 5 mol %. When it is at least the lower limit value of the above range, a crosslinked structure by siloxane is formed, and the cured product of the fluorinated polymer is hardly dissolved or hardly has cracks even if exposed to a solvent. When it is at most the upper limit value of the above range, the after-described coating composition containing the fluorinated polymer is hardly gelled and is excellent in storage stability.

A preferred embodiment of the fluorinated polymer is a fluorinated polymer containing units (1), (1a), (2) and (3), wherein in all the units of the fluorinated polymer, the content of the units (1) is from 0.1 to 99.7 mol %, the proportion of the units (1a) is from 0.1 to 98 mol %, the proportion of the units (2) is from 0.1 to 80 mol %, and the proportion of the units (3) is from 0.1 to 98 mol %, or a fluorinated polymer containing the units (1), (1a), (1b), (2) and (3), wherein in all the units of the fluorinated polymer, the content of the units (1) is from 0.1 to 99.6 mol %, the proportion of the units (1a) is from 0.1 to 98 mol %, the proportion of the units (1b) is from 0.1 to 98 mol %, the proportion of the units (2) is from 0.1 to 80 mol %, and the proportion of the units (3) is from 0.1 to 95 mol %.

The contents of the respective units in the fluorinated polymer can be calculated by $^{19}$F-NMR and $^1$H-NMR measurement.

The mass average molecular weight of the fluorinated polymer of the present invention is preferably from 5,000 to 500,000, particularly preferably from 10,000 to 100,000. When it is at least the lower limit value of the above range, the cured product of the fluorinated polymer is excellent in mechanical strength, when it is at most the upper limit value of the above range, when the fluorinated polymer is dissolved in a fluorinated solvent, the viscosity will be within a range of from 1 to 100 Pa·s, and the thickness of the cured product of the fluorinated polymer is easily adjusted.

The mass average molecular weight may be obtained as a molecular weight calculated as PMMA (polymethyl methacrylate) by gel permeation chromatography (GPC). Otherwise, it may be estimated from the molecular weight of the after-described precursor.

[Method for Producing Fluorinated Polymer]

The fluorinated polymer of the present invention can be produced by reacting a fluorinated polymer containing the units (1a) and not containing the units (1) (hereinafter sometimes referred to simply as a "precursor") and at least one silane compound selected from the group consisting of an aminosilane compound, an epoxysilane compound, a mercaptosilane compound and an isocyanatosilane compound. Such a silane compound may be used alone or in combination of two or more.

The precursor further has at least one type of units selected from the group consisting of the above units (1b), (2), (3) and (4), in addition to the units (1a), in accordance with the structure of the fluorinated polymer of the present invention to be produced.

The precursor may be obtained by polymerization by a known method (for example, the method disclosed in WO2015/098773).

The aminosilane compound is preferably a compound represented by the following formula (5):

wherein $R^1$ and $Y^1$ are as defined in the formula (1), and their preferred ranges are also the same.

The aminosilane compound is particularly preferably N-(2-aminoethyl)-3-aminopropylmethyldimethoxysilane, N-(2-aminoethyl)-3-aminopropyltrimethoxysilane, N-(2-aminoethyl)-3-aminopropylmethyldiethoxysilane, N-(2-aminoethyl)-3-aminopropyltriethoxysilane, 3-aminopropyltrimethoxysilane, 3-aminopropyltriethoxysilane, 3-aminopropylmethyldimethoxysilane, 3-aminopropylmethyldiethoxysilane, N-phenyl-3-aminopropyltrimethoxysilane, N-phenyl-3-aminopropyltriethoxysilane, N-phenyl-3-aminopropylmethyldimethoxysilane or N-phenyl-3-aminopropylmethyldiethoxysilane.

The epoxysilane compound is preferably a compound represented by the following formula (6):

wherein Ep is an epoxy group (that is, a 1,2-epoxyethyl group), $Y^{21}$ is as defined for $Y^2$, and is preferably $R^6$—$SiR^2_{m\ 1}(W^1)_{3-m\ 1}$.

The epoxysilane compound is particularly preferably 3-glycidoxypropylmethydimethoxysilane, 3-glycidoxypropyltrimethoxysilane, 3-glycidoxypropylmethyldimethoxysilane, 3-glycidoxypropyltrimethoxysilane, 3-glycidoxypropylmethyldiethoxysilane or 3-glycidoxypropyltriethoxysilane.

The mercaptosilane compound is preferably a compound represented by the following formula (7):

wherein $Y^3$ is as defined in the formula (1), and its preferred range is also the same.

The mercaptosilane compound is particularly preferably 3-mercaptopropylmethyldimethoxysilane, 3-mercaptopropyltrimethoxysilane, 3-mercaptopropylmethyldiethoxysilane or 3-mercaptopropyltriethoxysilane.

The isocyanatosilane compound is preferably a compound represented by the following formula (8):

wherein $Y^4$ is as defined for $Y^3$ and its preferred range is also the same.

The isocyanatosilane compound is preferably 3-isocyanatopropylmethyldimethoxysilane, 3-isocyanatopropyltrimethoxysilane, 3-isocyanatopropylmethyldiethoxysilane or 3-isocyanatopropyltriethoxysilane.

In a case where the fluorinated polymer contains units wherein $Z^1$ is $NR^1$—$Y^1$, such a fluorinated polymer may be produced by the following method.

(a) A precursor containing units (1a) wherein $Z^2$ is $OR^7$, and the aminosilane compound are reacted.

(b) A precursor containing units (1a) wherein $Z^2$ is a halogen atom, and the aminosilane compound or the isocyanatosilane compound are reacted.

(c) A precursor containing units (1a) wherein $Z^2$ is OH, and the isocyanatosilane compound are reacted.

In a case where the fluorinated polymer contains units wherein $Z^1$ is O—$Y^2$, such a fluorinated polymer may be produced by the following method.

(d) A precursor containing units (1a) wherein $Z^2$ is OH, and the epoxysilane compound are reacted.

(e) A precursor containing units (1a) wherein $Z^2$ is a halogen atom, and the epoxysilane compound are reacted.

In a case where the fluorinated polymer contains units wherein $Z^1$ is S—$Y^3$, such a fluorinated polymer may be produced by the following method.

(f) A precursor containing units (1a) wherein $Z^2$ is a halogen atom, and the mercaptosilane compound are reacted.

The proportions of the units wherein $Z^1$ is $NR^1$—$Y^1$, O—$Y^2$ and S—$Y^3$ can be calculated by obtaining the —COOR$^7$ groups in the fluorinated polymer of the present invention and in the precursor by NMR, and quantitatively determining the reacting amount from changes in absorption spectra of the —COOR$^7$ groups before and after the reaction by infrared spectroscopy (IR). Here, in a case where $Z^2$ is a halogen atom or OH, after such $Z^2$ is converted to OR$^7$, —COOR$^7$ groups are quantitatively determined by IR.

The total reaction amount of the silane compound is not particularly limited so long as a fluorinated polymer having a desired amount of —COZ$^1$ per 1 mole of the groups represented by —COZ$^2$ in the precursor can be obtained, and is preferably from 0.1 to 10 mol, more preferably from 0.3 to 5 mol, particularly preferably from 0.5 to 2 mol.

The reaction may be carried out in the absence or presence of a solvent. In a case where the reaction is carried out in the presence of a solvent, the solvent is preferably a solvent in which the raw material components (the precursor and the silane compound) are soluble, and is particularly preferably a solvent in which at least the precursor is soluble. In such a case, the reaction is carried out in a state where the raw material components are dissolved or dispersed in the solvent. Such a solvent may be a fluorinated solvent.

The fluorinated solvent may, for example, be a fluorinated alkane, a fluorinated aromatic compound, a fluoroalkyl ether, a fluorinated alkylamine or a fluoroalcohol.

The fluorinated alkane is preferably a $C_{4-8}$ compound. As commercial products, for example, $C_6F_{13}H$ (manufactured by Asahi Glass Company, Limited, ASAHIKLIN (registered trademark) AC-2000), $C_6F_{13}C_2H_5$ (manufactured by Asahi Glass Company, Limited, ASAHIKLIN (registered trademark) AC-6000), $C_2F_5CHFCHFCF_3$ (manufactured by Chemours, Vertrel (registered trademark) XF) may be mentioned.

The fluorinated aromatic compound may, for example, be hexafluorobenzene, trifluoromethylbenzene, perfluorotoluene or bis(trifluoromethyl)benzene.

The fluoroalkyl ether is preferably a $C_{4-12}$ compound. As commercial products, for example, $CF_3CH_2OCF_2CF_2H$ (manufactured by Asahi Glass Company, Limited, ASAHIKLIN (registered trademark) AE-3000), $C_4F_9OCH_3$ (manufactured by 3M, Novec (registered trademark) 7100), $C_4F_9OC_2H_5$ (manufactured by 3M, Novec (registered trademark) 7200) and $C_2F_5CF(OCH_3)C_3F_7$ (manufactured by 3M, Novec (registered trademark) 7300) may be mentioned.

The fluorinated alkylamine may, for example, be perfluorotripropylamine or perfluorotributylamine.

The fluoroalcohol may, for example, be 2,2,3,3-tetrafluoropropanol, 2,2,2-trifluoroethanol or hexafluoroisopropanol.

The fluorinated solvent has a fluorine atom content of, in view of excellent solubility of the fluorinated polymer, preferably at least 60%, more preferably from 65 to 77%, particularly preferably from 70 to 77%. In a case where the hydrolyzable silyl group in the fluorinated polymer is an alkoxy-containing silyl group, in view of excellent dispersibility of the fluorinated polymer, the fluorinated solvent is preferably a fluorinated solvent containing a hydrogen atom. The fluorinated solvent may be used alone or in combination of two or more.

As the solvent, other solvent may be used in combination, so long as at least 50 mass % of the solvent is the fluorinated solvent. Other solvent may be an ether compound or an alcohol compound. Such other solvent may be used to dissolve or dilute the silane compound. Each of such other solvents may be used alone or in combination of two or more.

In a case where the reaction is carried out in the presence of a solvent, the amount of the solvent used is preferably from 50 to 99 parts by mass, particularly preferably from 70 to 95 parts by mass per 100 parts by mass of the total amount of the precursor and the silane compound.

The reaction is preferably carried out, for example, by dissolving the precursor in the solvent and then adding the silane compound at from 0 to 30° C. After addition of the raw material components, the mixture is heated to 30 to 100° C. and reacted for from 1 minute to 10 hours to obtain the desired fluorinated polymer.

[Cured Product and Formed Product of Fluorinated Polymer]

The fluorinated polymer of the present invention is hydrolyzed and condensed by moisture and crosslinked to obtain a cured product. Accordingly, by forming the fluorinated polymer of the present invention and at the same time, by curing it by moisture, a formed product can be produced. On the other hand, the fluorinated polymer of the present invention is usually a liquid substance having a high viscosity, and forming using a liquid is necessary. Accordingly, it is preferred to form a membrane of the fluorinated polymer on a carrier, and to bring the surface of the membrane into contact with moisture and to infiltrate moisture into the interior of the membrane to cure the membrane, thereby to produce a cured product. A formed product consisting of the cured product can be obtained by separating the cured product from the carrier. On the other hand, a formed product having the cured product integrated with the carrier can be obtained by using a non-separable carrier. Hereinafter, a non-separable carrier will be referred to as a "substrate".

Moisture is necessary for curing the fluorinated polymer, and supply of moisture is carried out usually by bringing the air containing moisture into contact with the membrane of the fluorinated polymer. Supply of moisture may be carried out also by a method of bringing a gas other than the air containing moisture or a water-containing liquid into contact with the membrane of the fluorinated polymer.

A formed product obtained as separated from a separable carrier is preferably in a thin planar form such as a film form or a sheet form. Hereinafter such a planer form will be referred to as a "film". The thickness of the film is preferably from 1 to 500 μm, more preferably from 10 to 400 μm, particularly preferably from 30 to 300 μm. In a case where the membrane of the fluorinated polymer is thick, moisture hardly infiltrates into the interior of the membrane, and further in a case where the separable carrier is non moisture-permeable, moisture more hardly infiltrate into the surface in contact with the separable carrier. When the thickness is at most the upper limit value of the above thickness, the fluorinated polymer will be sufficiently cured, and a film having favorable physical properties will be obtained. When the thickness is at least the lower limit value of the above thickness, the film can be used as a film itself as separated from the separable carrier.

The separable carrier may be a carrier made from a non-adhesive material such as a fluororesin, or a carrier made from a material such as a resin or a metal, surface-treated to obtain a separable surface. Particularly preferred is a carrier of which the surface is made from a non-adhesive fluorinated material.

The shape of the substrate is not particularly limited and may, for example, be a plate form, a rod form, a tubular form, a string form or a fiber form. The material of the substrate may, for example, be a metal, glass, a ceramic, a resin or a rubber. The metal may, for example, be iron or an iron alloy, aluminum or an aluminum alloy, copper or a copper alloy, or nickel or a nickel alloy. The resin may, for example, be an acrylic resin, a vinyl chloride resin, a thermoplastic polyester resin, a polycarbonate resin or a silicone resin. The material of the substrate is preferably a metal or a resin.

The surface of the substrate may have a primer layer. A primer forming the primer layer is properly selected in accordance with the combination of the substrate and the solvent in the after-described coating composition. For example, a silane coupling agent or an epoxy elastomer may be mentioned. The primer layer is preferably formed on a substrate the surface of which may be insufficient in the adhesion to a cured product layer. Such a substrate may, for example, be a substrate having a resin surface.

Further, in the case of a substrate having a resin surface, the surface of the resin may be treated e.g. by UV treatment, corona treatment or plasma treatment. The surface of a resin having such a treatment applied thereto may have a primer layer.

With respect to the cured product integrated with a substrate, the thickness of the cured product may be smaller than the thickness of the film. Hereinafter, the cured product integrated with a substrate will be referred to as a "layer" on the substrate. The thickness of the layer is preferably from 0.1 to 300 μm, more preferably from 1 to 200 μm, particularly preferably from 10 to 150 μm. When the thickness is at most the upper limit of the above thickness, the fluorinated polymer is sufficiently cured to obtain a cured product integrated with a substrate. When it is at least the lower limit, the strength of the cured product is secured and in addition, a function to protect the substrate is achieved.

In formation of a film or layer consisting of the cured product of the fluorinated polymer of the present invention, in order to form a membrane of the fluorinated polymer, it is preferred to use a composition containing the fluorinated polymer of the present invention and a solvent (hereinafter sometimes referred to as a "coating composition").

It is possible to form a membrane of the fluorinated polymer by applying the coating composition to the separable carrier or substrate and removing the solvent. On this occasion, since a liquid having a viscosity lower than that of the fluorinated polymer may be used to form a membrane of the liquid, the coating operation is easy, and the thickness of the membrane of the fluorinated polymer can easily be adjusted. Further, various additives may be blended depending upon the purpose of the application.

Hereinafter, with reference to a case of forming a layer consisting of the cured product of the fluorinated polymer of the present invention on the substrate, as an example, the coating composition, a method of its use, etc. will be described. Needless to say, it should be understood that a film and other formed product can be produced by the following coating composition and method of its use, as described above.

[Coating Composition]

The coating composition of the present invention contains the fluorinated polymer of the present invention and a solvent. A reaction product containing the fluorinated polymer and the fluorinated solvent obtained in production of the fluorinated polymer may be used as it is. The content of the fluorinated polymer in the coating composition is preferably from 1 to 99 mass %, more preferably from 1 to 50 mass %, particularly preferably from 5 to 30 mass %. Within the above range, the thickness of the cured product of the fluorinated polymer can be adjusted.

The solvent is preferably the above-described fluorinated solvent. As the solvent, the above-described ether compound or alcohol compound may be used in combination with the fluorinated solvent. The content of the solvent in the coating composition is preferably from 1 to 99 mass %, more preferably from 50 to 99 mass %, particularly preferably from 70 to 95 mass %. The content of the fluorinated solvent in the solvent is preferably from 50 to 100 mass %, particularly preferably from 80 to 100 mass %. Within the above range, the coating composition can be uniformly applied.

The coating composition may contain, as the case requires, other components such as a curing catalyst, inorganic particles, an alkoxysilane, a silane coupling agent or a fluoropolyether compound. Each of such other components may be used alone or in combination of two or more.

By the coating composition containing a curing catalyst, the fluorinated polymer can be heat-cured at a relatively low temperature, even when the hydrolyzable silyl group has low reactivity. The curing catalyst may be an organic metal compound such as tetraisopropyl titanate, tetrabutyl titanate, titanium acetylacetonate, aluminum triisobutoxide, aluminum triisopropoxide, tris(acetylacetonate) aluminum, diisopropoxy(ethyl acetoacetate) aluminum, dibutyltin dilaurate or dibutyltin dioctoate, or an organic acid having an acid dissociation constant higher than that of acetic acid in a non-aqueous solvent.

Such an organic acid is preferably methanesulfonic acid, benzenesulfonic acid, p-toluenesulfonic acid, oxalic acid, trichloroacetic acid, trifluoroacetic acid, pentafluorobenzoic acid, hexafluoroglutaric acid or octafluoroadipic acid, and with a view to accelerating condensation with a small amount, particularly preferably p-toluenesulfonic acid.

The content of the curing catalyst in the coating composition is preferably from 0.01 to 1 mass %, particularly preferably from 0.05 to 0.2 mass % to the fluorinated polymer. Within such a range, excellent curing rate is achieved, and the coating composition is excellent in storage stability.

The inorganic particles may be particles of a metal oxide such as silica, titania, zirconia or alumina or a phosphor. The diameter of the inorganic particles is not particularly limited and is preferably from 1 to 100 nm, particularly preferably from 1 to 20 nm. Within such a range, light scattering of the cured product of the fluorinated polymer can be suppressed. The content of the inorganic particles in the coating composition is preferably from 20 to 200 mass %, particularly preferably from 50 to 100 mass % to the fluorinated polymer. When it is at least the lower limit value of the above range, the cured product of the fluorinated polymer is excellent in the refractive index. When it is at most the upper limit value of the above range, the coating composition is excellent in coating properties.

By the coating composition containing an alkoxysilane or a silane coupling agent, the cured product of the fluorinated polymer is excellent in adhesion to the substrate. By the coating composition containing a fluoropolyether compound, Tg (glass transition temperature) is decreased and the viscosity is decreased, whereby the amount of the solvent can be reduced. The silane coupling agent and the fluoropolyether compound may, for example, be ones as disclosed in WO2015/098773. The alkoxysilane may, for example, be one as disclosed in the catalog of Shin-Etsu Chemical Co., Ltd. or the catalog of Momentive Performance Materials. The total content of other components in the coating composition is preferably from 1 to 70 mass %, particularly preferably from 5 to 50 mass %. The solid content of the coating composition is preferably from 1 to 99 mass %.

The cured product of the fluorinated polymer of the present invention may be produced by a method of applying the coating composition of the present invention to the substrate surface, and removing the solvent, followed by heat curing.

The fluorinated polymer of the present invention, which has hydrolyzable silyl groups, is crosslinked at low temperature by moisture in the air. Crosslinking occurs by heating in the solvent removal step and after solvent removal. Heating in solvent removal and after solvent removal is carried out preferably at low temperature. Low temperature means a range of from room temperature (for example, 20° C.) to 150° C., preferably from room temperature to less than 100° C., particularly preferably from room temperature to 90° C.

In a case where the material of the substrate is a metal or a ceramic, in order to avoid drawbacks such as bubbling or adhesion failure by a remaining solvent, it is preferred to heat the substrate to a temperature of at least the boiling point of the solvent. On the other hand, in a case where the substrate is made of a resin, in order to suppress deformation of the substrate by heating, it is preferred to use a solvent having a boiling point of at most the deformation temperature of the resin and to volatilize the solvent at a temperature of at most the deformation temperature.

As a method of applying the coating composition, spin coating, wipe coating, spray coating, squeeze coating, dip coating, die coating, ink jet method, blow coating, roll coating, casting, Langmuir-Blodgett method or gravure coating may, for example, be mentioned.

To cure the fluorinated polymer of the present invention, curing in combination with ultraviolet rays may also be possible. In a case where the fluorinated polymer has units wherein $Z^2$ is $OR^7$, such a fluorinated polymer may be crosslinked in the same manner as disclosed in WO2015/098773.

EXAMPLES

Now, the present invention will be described in further detail with reference to Examples and Comparative Examples. However, it should be understood that the present invention is by no means restricted to such specific Examples. Ex. 1 to 4, 6 and 7 are Examples of the present invention, and Ex. 5 and 8 are Comparative Examples. Evaluations in each Ex. were carried out by the following methods.

[Evaluation Method]
(Mass Average Molecular Weight)

The mass average molecular weight of each of the fluorinated polymer and the precursor is calculated as a molecular weight calculated as PMMA (polymethyl methacrylate) using $CF_2ClCF_2CHClF$ (manufactured by Asahi Glass Company, Limited, tradename: AK-225cb) as a solvent by gel permeation chromatography (GPC).

(Contents of Groups)

The contents of the groups represented by —$COZ^1$, —$COOCH_3$ and —$COCF=CF_2$ in each of the fluorinated polymer and the precursor were obtained by $^{19}$F-NMR.

(Elastic Modulus and Tg)

They were measured by using films produced in Ex. by TMA/EXSTAR SS7100 manufactured by Hitachi High-Technologies Corporation at viscoelasticity analysis mode. Measurement temperature range: −50° C. to 200° C., temperature-raising rate: 5° C./min, frequency: 0.05 Hz.

(Outer Appearance)

The outer appearance of the obtained film was observed and evaluated based on the following standards.

○ (good): No surface irregularity nor bubbling confirmed.

Δ (acceptable): Surface irregularity observed.

x (poor): Bubbling occurred.

(Immersion Test)

The obtained film was immersed in AC-2000. The change of the shape of the film was confirmed and evaluated based on the following standards.

○ (good): The film only slightly swelled, and the shape of the film was kept.

Δ (acceptable): The shape of the film changed.

x (poor): The film was dissolved, and its shape was not maintained.

(Heat Resistance Test)

The obtained film was heated in a hot air oven at 200° C. for 30 minutes. Whether bubbling occurred on the film or not was confirmed and evaluated based on the following standards.

○ (good): No bubbling occurred.

x (poor): Bubbling occurred.

(Elongation at Break and Breaking Strength)

The elongation at break and the breaking strength of the obtained film at 200° C. were measured by TMA/EXSTAR SS7100 manufactured by Hitachi High-Technologies Corporation at displacement control mode. Tensile rate: 1 mm/min.

(Adhesion)

Two slide glasses were bonded by a fluorinated polymer so that the bond area would be 2.5 cm×0.5 cm and heated in a drier at 60° C. Then, the assembly was immersed in water at 60° C. or in acetone at 50° C., and kept for 24 hours. Whether the slide glasses were separated or not was confirmed and evaluated based on the following standards.

○ (good): No separation observed.

x (poor): Separation observed.

(Chemical Resistance)

An acrylic resin sheet (3 cm×1 cm, 1 mm in thickness) was immersed in a coating composition (solid content concentration: 15 mass %), withdrawn and dried at room temperature for one hour. The acrylic resin sheet was again immersed in the coating composition and withdrawn, dried at room temperature for one hour and further dried in a dryer at 60° C. for one hour to obtain an acrylic resin sheet having a layer of a cured product of the fluorinated polymer. The thickness of the cured product of the fluorinated polymer was about 10 μm as calculated from the mass change. The acrylic resin sheet was immersed in acetone at room temperature for 5 hours, and whether the acrylic resin sheet was dissolved or not was confirmed and evaluated based on the following standards.

○ (good): The sheet not dissolved.

x (poor): The sheet dissolved.

[Units]

Units mentioned in the following Production Examples are as follows.

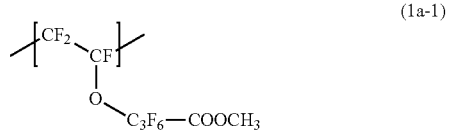

(1a-1)

(1-1)

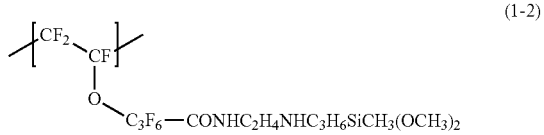

(1-2)

(1-3)

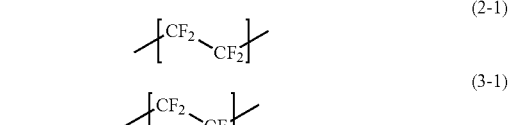

(2-1)

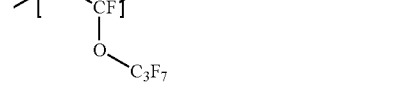

(3-1)

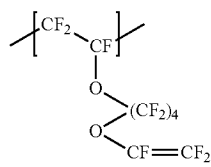

(3-2)

Ex. 1

Into a stainless steel autoclave equipped with a stirring machine having an internal capacity of 1 L, 0.5 g of V601 (manufactured by Wako Pure Chemical Industries, Limited) as a polymerization initiator was charged, followed by vacuum deaeration, and 48 g of $CF_2=CFOCF_2CF_2CF_2COOCH_3$, 795 g of $CF_2=CFOCF_2CF_2CF_3$ (hereinafter sometimes referred to as "PPVE") and 36 g of AC-2000 were charged. 122 g of TFE was injected with stirring, and the internal temperature was raised to 70° C., followed by polymerization for 4 hours. Progress of the reaction was confirmed by a decrease of the pressure of from 1.26 MPa to 0.94 MPa over the period of 4 hours.

The autoclave was cooled, the content was put in a 5 L glass beaker, and 4 L of methanol was added with stirring. The upper layer was removed, and the lower layer was heated under reduced pressure to distill the remaining monomer components off thereby to obtain 107.5 g of precursor P1. Precursor P1 was soluble in AK225cb and in AC-2000, and its composition was units (1a-1):units (2-1):units (3-1) =3:67:30 (molar ratio).

1.2 g of precursor P1 was dissolved in 8.8 g of AC-2000, and 0.25 g of a solution having 3-aminopropylmethyldimethoxysilane (manufactured by Tokyo Chemical Industry Co., Ltd.) diluted 5 fold with dehydrated methanol was added, followed by vigorous stirring at room temperature, to obtain a reaction product containing fluorinated polymer P21. A part (1.2 g) of the reaction product was used as a coating composition. The content of fluorinated polymer P21 in the coating composition was 12.0 mass %, the content of the solvent in the coating composition was 87.8 mass %, and the content of the fluorinated solvent in the solvent was 97.8 mass %.

The coating composition was poured into a box boat (2 cm×2 cm×7 mm in depth) prepared by an ETFE sheet (Aflex manufactured by Asahi Glass Company, Limited) and heated on a hotplate at 40° C. for 1 hour and then at 60° C. for 1 hour to volatilize the solvent, thereby to prepare a colorless and transparent film having a thickness of 160 µm.

The obtained film was subjected to IR measurement, whereupon absorption at 1,794 cm$^{-1}$ assigned to C=O of the —COOCH$_3$ group in the unit (1a-1) substantially disappeared, and absorption at 1,705 cm$^{-1}$ assigned to C=O of a —CONH group newly appeared, and accordingly formation of the units (1-1) was confirmed. Further, the dynamic viscoelasticity of the film was measured, and the results are shown in FIG. 1. A decrease of the elastic modulus corresponding to Tg was observed in the vicinity of 5° C., and at a temperature of at least Tg, a rubbery plateau at which the elastic modulus was substantially constant appeared up to at least 200° C., and accordingly occurrence of a crosslinking reaction on the film was confirmed.

The evaluation results are shown in Tables 1 and 2.

Ex. 2

1.2 g of precursor P1 obtained in Ex. 1 was dissolved in 6.8 g of AC-2000, and 0.12 g of a solution having N-(2-aminoethyl)-3-aminopropylmethyldimethoxysilane (manufactured by Tokyo Chemical Industry Co., Ltd.) diluted 5 fold with dehydrated methanol was added, followed by vigorous stirring at room temperature, to obtain a reaction product containing fluorinated polymer P22. A part (1.2 g) of the reaction product was used as a coating composition. The content of fluorinated polymer P22 in the coating composition was 15.1 mass %, the content of the solvent in the coating composition was 84.8 mass %, and the content of the fluorinated solvent in the solvent was 98.6 mass %.

The coating composition was poured into the same box boat as in Ex. 1 and heated on a hotplate at 30° C., at 50° C. and at 70° C. respectively for 1 hour to volatilize the solvent, thereby to prepare a film having a thickness of 230 µm.

Figure 2:
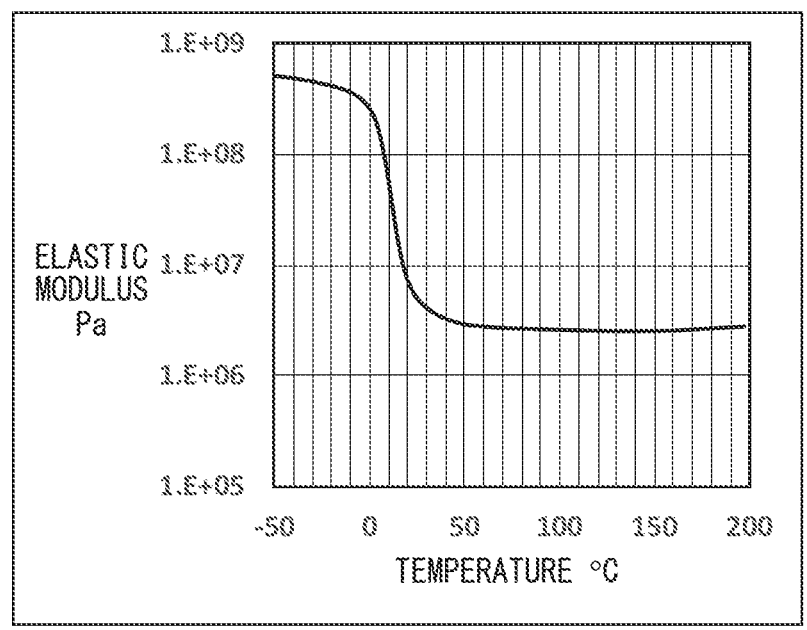
FIG. 2 is a view illustrating the relation between the temperature and the elastic modulus of the film obtained in Ex. 2.

The obtained film was subjected to IR measurement, whereupon absorption at 1,794 cm$^{-1}$ assigned to C=O of the —COOCH$_3$ group in the unit (1a-1) slightly remained but substantially replaced by absorption at 1,705 cm$^{-1}$ assigned to C=O of a —CONH group, and accordingly formation of the units (1-2) was confirmed. Further, the dynamic viscoelasticity was measured, and the results are shown in FIG. 2. A decrease of the elastic modulus corresponding to Tg was observed in the vicinity of 5° C., and at a temperature of at least Tg, a rubbery plateau at which the elastic modulus was substantially constant appeared up to at least 200° C., and accordingly occurrence of a crosslinking reaction on the film was confirmed.

The evaluation results are shown in Tables 1 and 2.

Ex. 3

1.2 g of precursor P1 obtained in Ex. 1 was dissolved in 6.8 g of AC-2000, and 0.05 g of aminopropyltriethoxysilane (manufactured by Tokyo Chemical Industry Co., Ltd.) was added, followed by vigorous stirring at room temperature until the solution became uniform, to obtain a reaction product containing fluorinated polymer P23. A part (1.2 g) of the reaction product was used as the coating composition. The content of fluorinated polymer P23 in the coating composition was 15.2 mass %, the content of the solvent in the coating composition was 84.5 mass %, and the content of the fluorinated solvent in the solvent was 100 mass %.

The coating composition was poured into the same box boat as in Ex. 1 and heated on a hotplate at 30° C., at 50° C. and at 70° C. respectively for 1 hour to volatilize the solvent, thereby to prepare a film having a thickness of 200 µm.

The obtained film was subjected to IR measurement, whereupon absorption at 1,794 cm$^{-1}$ assigned to C=O of the —COOCH$_3$ group in the unit (1a-1) remained but absorption at 1,705 cm$^{-1}$ assigned to C=O of a —CONH group newly formed, and accordingly formation of the units (1-3) was confirmed. Further, the dynamic viscoelasticity was measured, whereupon a decrease of the elastic modulus corresponding to Tg was observed in the vicinity of −5° C., and at a temperature of at least Tg, a rubbery plateau at which the elastic modulus was substantially constant appeared up to at least 200° C., and accordingly occurrence of a crosslinking reaction was confirmed.

The evaluation results are shown in Tables 1 and 2.

Ex. 4

A reaction product containing fluorinated polymer P24 was obtained in the same manner as in Ex. 1 except that Novec 7300 ($C_2F_5CF(OCH_3)C_3F_7$) was used instead of AC-2000. A part (1.2 g) of the reaction product was used as a coating composition. The content of fluorinated polymer P24 in the coating composition was 12.0 mass %, the content of the solvent in the coating composition was 87.8 mass %, and the content of the fluorinated solvent in the solvent was 97.8 mass %.

The coating composition was poured into the same box boat as in Ex. 1 and heated on a hotplate at 40° C. for one hour, at 60° C. for one hour and then at 90° C. for 30 minutes to volatilize the solvent, whereupon a patchy film with a cloudy portion and a clear portion was obtained.

The evaluation results are shown in Tables 1 and 2.

Ex. 5

Fluorinated polymer X having units (2-1), $CF_2=CFOC_4F$ $OCF=CF_2$ (hereinafter sometimes referred to as "$C_4DVE$") units (3-2) and PPVE units (3-1) in a molar ratio of 67:7:26 was produced in accordance with Preparation Example 1 of WO2009/096342. 1.7 g of AC-2000 was added to 0.3 g of fluorinated polymer X to obtain a coating composition. The content of fluorinated polymer X in the coating composition was 15 mass %, the content of the solvent in the coating composition was 85 mass %, and the content of the fluorinated solvent in the solvent was 100 mass %.

0.8 g of the coating composition was poured into the same box boat as in Ex. 1 and heated at 40° C. for one hour, at 60° C. for one hour, at 90° C. for 30 minutes and at 150° C. for 30 minutes to obtain a colorless and transparent film having a thickness of 100 μm. On the other hand, 1.6 g of the coating composition produced in the same manner as above was poured into the same box boat as in Ex. 1 and heated at 40° C. for one hour, at 60° C. for one hour, at 90° C. for 30 minutes and at 150° C. for 30 minutes so as to try to obtain a film having a thickness of 200 μm, however, the coating composition bubbled, thus leading to failure in the outer appearance. Further, 0.8 g of the coating composition was poured into the same box boat as in Ex. 1 and heated in the same manner as in Ex. 1 on a hotplate at 40° C. for one hour and at 60° C. for one hour, however, the fluorinated polymer was not heat-crosslinked, and a film was not obtained.

The evaluation results are shown in Tables 1 and 2.

In Examples of the present invention, films having a thickness of 200 μm were obtained by heating at low temperature of from 60° C. (Ex. 1) to 90° C. (Ex. 4), and low temperature curing was possible. By comparison of Ex. 1 to 3, in Ex. 1 and 2 in which the number of carbon atoms in the alkoxy group which the hydrolyzable silyl group has is 1, the results in the immersion test and the heat resistance test were "○ (favorable)", and the crosslinking reaction significantly proceeded. By comparison of Ex. 1 and 4, in Ex. 1 in which the fluorine content of the fluorinated solvent contained in the coating composition was high, the solubility of the fluorinated polymer was high, and a film having a favorable outer appearance could be obtained.

In Ex. 5, the film could not be formed at low temperature of 60° C., and low temperature curing was not possible. Further, even when heat curing was conducted by heating at 150° C., in a film having a thickness of 200 μm, bubbling was confirmed at the time of curing.

Ex. 6

1 Part of EPOFRIEND (manufactured by Daicel Corporation, epoxylated thermoplastic elastomer) was dissolved in 100 parts of cyclopentanone to prepare a primer solution. The primer solution was applied to one surface of a rigid vinyl chloride resin sheet (size: 3 cm×5 cm, thickness: 1 mm) and dried at room temperature for one day to form a primer layer having a thickness of 10 μm. Then, on the primer layer, the coating composition obtained in Ex. 2 was applied and heat-dried at room temperature for 1 hour, at 50° C. for 1 hour, and at 70° C. for 5 minutes to form a layer of a cured product of fluorinated polymer P22 having a thickness of 60 μm.

Cross-cut adhesion test was conducted on the cured product layer, whereupon all 100 portions remained without separation, and the cured product of the fluorinated polymer of the present invention could be bonded to the rigid vinyl chloride resin via a primer. By selecting a proper combination of the primer and the solvent, the fluorinated polymer of the present invention can be bonded by curing to a resin substrate of which the heat resistance temperature is limited.

TABLE 1

| Ex. | Type | Content of groups (mmol/g) —COZ[1] | —COOCH$_3$ | —COCF=CF$_2$ | Mass average molecular weight | Tg (° C.) |
|---|---|---|---|---|---|---|
| 1 | Precursor P1 | 0 | 0.17 | — | 58,300 | 6 |
|   | Fluorinated polymer P21 | 0.17 | 0 | — | Unmeasurable | In the vicinity of 5 |
| 2 | Fluorinated polymer P22 | 0.15 | 0.02 | — | Unmeasurable | In the vicinity of 5 |
| 3 | Fluorinated polymer P23 | 0.12 | 0.05 | — | Unmeasurable | In the vicinity of −10 |
| 4 | Fluorinated polymer P24 | 0.17 | 0 | — | Unmeasurable | Not measured |
| 5 | Fluorinated polymer X | — | — | 0.20 | 25,000 | 7 |

TABLE 2

| Ex. | Fluorinated polymer | Outer appearance | Immersion test | Heat resistance test | Elongation at break (%) | Breaking strength (MPa) | Adhesion (acetone) | Adhesion (water) | Chemical resistance |
|---|---|---|---|---|---|---|---|---|---|
| 1 | P21 | ○ | ○ | ○ | 40 | 1 | ○ | ○ | ○ |
| 2 | P22 | ○ | ○ | ○ | 35 | 0.8 | ○ | ○ | ○ |
| 3 | P23 | ○ | Δ | x | ND | ND | ○ | ○ | ○ |
| 4 | P24 | Δ | ○ | ○ | ND | ND | ○ | ○ | ○ |
| 5 |   | x | x | — | — | — | x | x | ○ |

Ex. 7

The coating composition in Ex. 2 was applied to one side of a nickel test piece of 2 cm×5 cm, 2 mm in thickness and dried at room temperature for one hour, at 50° C. for one hour and at 100° C. for 30 minutes to form a layer of a cured product of fluorinated polymer P22 having a thickness of 50 μm.

Cross-cut adhesion test was conducted on the cured product layer, whereupon all 100 portions remained without separation, and the cured product was directly bonded without primer. Accordingly, the fluorinated polymer of the present invention can be directly bonded by curing to a metal substrate.

Ex. 8

A layer of fluorinated polymer X having a thickness of 50 μm was formed on a nickel test piece in the same manner as in Ex. 7 except that the coating composition in Ex. 5 was used instead of the coating composition in Ex. 2, and then the layer was irradiated with ultraviolet light from a low pressure mercury lamp to cure fluorinated polymer X.

Cross-cut adhesion test was conducted on the layer of the cured fluorinated polymer X, whereupon the coating film remained only on 10 portions among 100 portions. Accordingly, the fluorinated polymer in Ex. 5 which is a known Example had poor adhesion to nickel.

INDUSTRIAL APPLICABILITY

According to the present invention, a fluorinated polymer which can be heat-cured at low temperature can be provided.

The fluorinated polymer of the present invention is useful as an optical material, a sealing material for devices, an inorganic EL phosphor dispersing material, a material for an optical waveguide, a heat resistant/chemical resistant sealing material, an adhesive or a coating material. The coating composition of the present invention is useful as a release agent, an antifouling coating material, a chemical resistant protective coating material, etc.

A formed product consisting of a cured product formed from the fluorinated polymer of the present invention is useful as a clad material of optical fibers, or a core material or a clad material of an optical waveguide.

The substrate comprising a cured product formed from the fluorinated polymer of the present invention is useful as a light-emitting device, a semiconductor device, a solar cell, a short wavelength light-emitting device, an electric wire and a coil using it, etc.

This application is a continuation of PCT Application No. PCT/JP2017/029683, filed on Aug. 18, 2017, which is based upon and claims the benefit of priority from Japanese Patent Application No. 2016-167131 filed on Aug. 29, 2016. The contents of those applications are incorporated herein by reference in their entireties.

What is claimed is:

1. A fluorinated polymer containing units represented by the following formula (1):

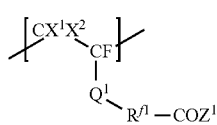

(1)

wherein $X^1$ and $X^2$ are each independently a hydrogen atom or a fluorine atom, $Q^1$ is a single bond or an etheric oxygen atom, $R^{f1}$ is a fluoroalkylene group or a fluoroalkylene group having at least 2 carbon atoms and having an etheric oxygen atom between carbon atoms, $Z^1$ is $NR^1$—$Y^1$, O—$Y^2$ or S—$Y^3$, $R^1$ is a hydrogen atom, an alkyl group or an aryl group, and $Y^1$, $Y^2$ and $Y^3$ are each independently a group having at least one hydrolyzable silyl group.

2. The fluorinated polymer according to claim 1, wherein the units represented by the formula (1) are —[$CF_2$—CF(O($CF_2$)$_3$CONH—$C_3H_6$—$SiR^2_{m\ 1}$ ($W^1$)$_{3-m\ 1}$)]— or —[$CF_2$—CF(O($CF_2$)$_3$CONH—$C_2H_4$—NH—$C_3H_6$—$SiR^2_m$ ($W^1$)$_{3-m\ 1}$)]—, wherein $R^2$ is each independently an alkyl group, $W^1$ is each independently a halogen atom or an alkoxy group, and m is each independently 0, 1 or 2.

3. The fluorinated polymer according to claim 1, which further contains units represented by the following formula (1a):

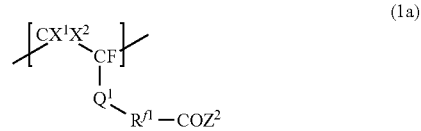

(1a)

wherein $X^1$, $X^2$, $Q^1$ and $R^{f1}$ are as defined in claim 1, $Z^2$ is a halogen atom, OH or $OR^7$, and $R^7$ is an alkyl group.

4. The fluorinated polymer according to claim 3, wherein $Z^1$ is $NR^1$—$Y^1$, and $Z^2$ is $OR^7$.

5. The fluorinated polymer according to claim 1, which further contains units derived from a fluoroethylene.

6. The fluorinated polymer according to claim 1, which further contains units represented by the following formula (3) (excluding units derived from a fluoroethylene):

—[$CX^3X^4$—$CX^5X^6$]— (3)

wherein $X^3$ and $X^4$ are each independently a hydrogen atom, a fluorine atom or a chlorine atom, $X^5$ is a hydrogen atom, a fluorine atom or a chlorine atom, and $X^6$ is a hydrogen atom, a fluoroalkyl group, a fluoroalkyl group having at least 2 carbon atoms and having an etheric oxygen atom between carbon atoms, a fluoroalkoxy group, a fluoroalkoxy group having at least 2 carbon atoms and having an etheric oxygen atom between carbon atoms, a fluoroalkenyl group, or a fluoroalkenyl group having at least 3 carbon atoms and having an etheric oxygen atom between carbon atoms.

7. The fluorinated polymer according to claim 1, wherein the content of the group represented by —$COZ^1$ is from 0.01 to 4 mmol/g.

8. A method for producing the fluorinated polymer as defined in claim 1, which comprises reacting a fluorinated polymer containing units represented by the following formula (1a) and not containing the above units (1), and at least one compound selected from the group consisting of an aminosilane compound, an epoxysilane compound, a mercaptosilane compound and an isocyanatosilane compound:

(1a)

wherein $X^1$, $X^2$, $Q^1$ and $R^{f1}$ are as defined in claim 1, and $Z^2$ is as defined in claim 3.

9. A coating composition, which comprises the fluorinated polymer as defined in claim 1, and a fluorinated solvent.

10. A cured product of the fluorinated polymer as defined in claim 1.

11. A formed product formed from the cured product as defined in claim 10.

12. The formed product according to claim 11, which is a film.

13. An article comprising a substrate, and a layer of a cured product of the fluorinated polymer as defined in claim 1, formed on the surface of the substrate.

14. The article according to claim 13, которая has a primer layer between the surface of the substrate and the layer of a cured product of the fluorinated polymer.

\* \* \* \* \*